Patented Nov. 26, 1946

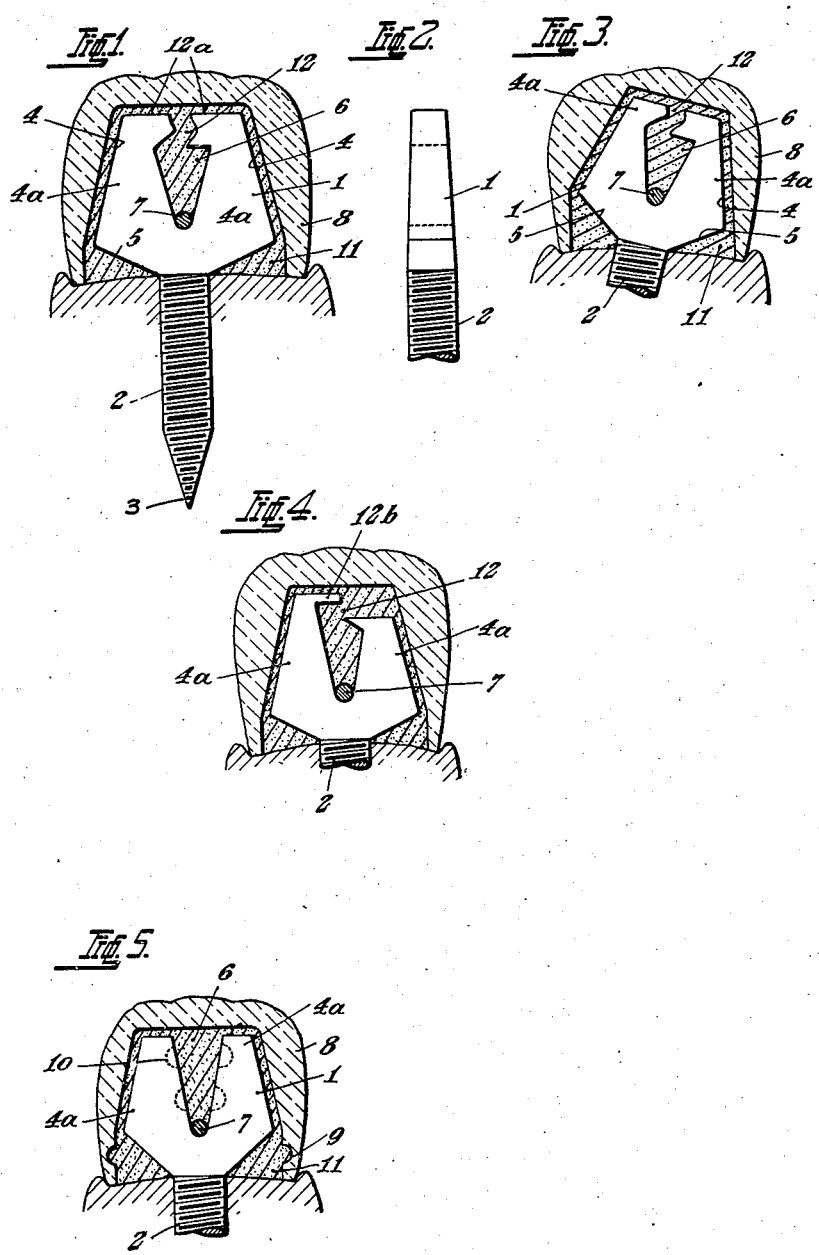

2,411,758

UNITED STATES PATENT OFFICE 2,411,758

TOOTH ROOT PIVOT

Joseph Ruetz, Biel, Switzerland

Application February 22, 1945, Serial No. 579,216
In Switzerland November 12, 1943

9 Claims. (Cl. 32—13)

This invention relates to tooth root pivots and more particularly to a type of pivots, whereupon tooth crowns can be mounted and secured.

Tooth root pivots are known, which have formed a groove in the head of the pivot, wherein the tooth crown is engaged, or the pivot head is provided with a projection which secures the crown. Other known tooth root pivots have a head with a curved bottom portion and a ball shaped top portion for the fixation of the artificial cap upon the pivot. In another known form a straight traversing pin is used for the connection of the tooth crown with the natural root. All these forms have found only a very limited use, because they fail to meet the requirements of the practice.

One object of the present invention is to provide a tooth root pivot which is free of the disadvantages of the prior art constructions.

Another object is to provide a tooth root pivot which can be mounted at any desired depth in the root stump.

A still further object of the invention is to provide a tooth root pivot which can be used for inclined tooth roots as well as for vertical standing roots and which in either case can be hermetically sealed with gold protecting caps.

These and other objects which will appear more clearly as the specification proceeds are accomplished according to the invention by the arrangement and combination of elements set forth in the following detailed description, defined in the appended claims and illustratively exemplified in the accompanying drawing, in which Fig. 1 is a front view of one embodiment of a tooth root pivot according to the invention inserted in a vertical root canal, the mounted crown being shown in section.

Fig. 2 is a side elevation of the pivot shown in Fig. 1.

Fig. 3 is a front view of the same embodiment inserted in an oblique root canal, the crown mounted thereupon being shown in section.

Fig. 4 is a front view of a second embodiment of the invention, showing legs of unequal length, and Fig. 5 is a front view of a third embodiment of the invention.

The tooth root pivot illustrated in Fig. 1 has a plate-shaped head 1 of approximately rectangular shape and a cylindrical shaft 2 ending in a point 3, which is provided over its entire length with a very fine screw thread. The upper portion of the head 1 is upwardly tapered and presents two opposite surfaces 4, which have such an inclination that, when the root pivot is inserted, for instance, into a somewhat oblique root-canal, neither surface 4 will be inclined outwardly beyond the vertical, so that the crown may always be vertically mounted upon the head 1, as shown in Fig. 3. From the lower ends of the surface 4, the cross section of the head 1 is downwardly reduced to that of the shaft 2 to permit the conical lower portion 5 of the head 1 to be sunk to some extent into the root stump. A substantially V-shaped slot 6 is provided centrally of the head 1 to divide the head into two legs 4a of equal length. The top ends of said legs 4a have formed inwardly directed projections 12a leaving therebetween a zig-zag passage 12. The lower narrow end of the slot 6 is disposed at about one-third of the height of the head and rounded to accommodate a cross pin 7 which is rigid with the crown 8 and can be passed through the passage 12. Transversely, the head 1 is slightly upwardly tapered, as shown in Fig. 2.

The mounting of the crown 8 requires the following preparations: The root stump is provided with a pointed bore which is slightly smaller in diameter and has approximately the same length as the pivot shaft 2 which is to be screwed into said bore. A small quantity of thinly liquid cement is placed in the bore and the tooth root pivot is then screwed in. As the screw thread of the shaft 2 is very fine, it will be impressed into the wall of the bore without a preliminary threading of the latter. Owing to the cement or other joining substance, which may be used, the tooth root pivot becomes integral with the root stump and can no more be unscrewed or extracted therefrom. An impression is then taken of the protruding head 1 of the tooth root pivot and of the upper surface of the root stump by means of a ring which is put over the pivot head. The space between the undercut portion of the head and the surface of the root is filled up with cement and remain in this state, as this undercut portion does not serve for securing the crown. The crown is formed according to said impression and provided with a cross pin 7. Just before the crown 8 is mounted the crown as well as the slot 6 are filled with cement. The crown 8 is then placed upon the pivot head 1 with its cross pin 7 at the entrance to the passage 12 and is downwardly moved under simultaneous lateral movements according to the profile of the passage 12. Excess cement can flow away between the crown and the root stump.

The tooth root pivot illustrated in Fig. 3 has a shaft 2 with a very fine screw thread, as the above described embodiment. The root and the screwed in pivot are in an oblique position. The crown 8 can nevertheless be mounted in the desired normal, vertical position, because the surfaces 4 of the head are not inclined outwardly beyond the vertical. As the upper portion of the head of the tooth root pivot is upwardly tapered, it is possible within certain limits to mount the crown 8 vertically upon the head of an inclined root pivot with the use of the hardening filling substance 11. The crown pin 7 at the bottom of the slot 6 prevents the crown 8, after the solidification of the filling substance 11, from being lifted off the root pivot.

The upper portion of the slot 6 in the head 1 of the root pivot is narrowed by the inwardly directed projections of the two legs 4a, defining therebetween the zig-zag passage 12 for the cross pin 7 of the crown 8. When the crown 8 with the cross pin 7 is mounted, the latter is passed through the passage 12 into the slot 6 by corresponding lateral and downward movements of the crown, which can be performed, owing to the tapered shape of the pivot head. Then, the crown slides down along the vertical guiding surfaces 4 of the head and the cross pin 7 slides therewith along the vertical surface of the slot until it arrives at the bottom of the slot and the crown assumes exactly the desired position on the head of the root pivot.

Fig. 4 shows, that the legs 4a of the head 1 may be of different lengths and limited on their upper sides by plain surfaces at right angles to the shaft. This embodiment facilitates the mounting of the crown upon the head of the root pivot, as the cross pin 7 is brought below the upper, inwardly directed projection 12b by a single lateral displacement of the crown. Then, a downward movement brings the crown into the accurate position upon the head, where it is immobilised by the solidification of the filling substance.

The embodiment according to Fig. 5 has on its inside at the lower end of the crown a furrow 9, which is to be filled with cement. The undercut space below the head 1 is also filled with cement, so that on mounting of the crown, the filling substance 11 will join and produce a permanent fixation after hardening. The crowns of the embodiments according to Figs. 1 to 4 may also be provided with an internal furrow which provides a further fixation of the crown upon the head in addition to the fixation by the immobilised cross pin. The slot 6 in Fig. 5 is downwardly reduced in the form of a V and the inner opposite sides of the legs 4a are provided with notches 10 for anchoring the filling substance and the crown with the cross pin 7.

The root pivot consists preferably of inoxidisable metals or alloys, as gold, rustless steel etc., the crown of metals, as gold, artificial material, porcelain etc.

What I claim is:

1. A tooth root pivot, comprising a substantially cylindrical shaft provided with a screw thread, a plate-shaped head integral with the upper end of said shaft, the lower edges of said head extending upwardly and outwardly from the top of the shaft at an angle of about 120° relative to the axis of the shaft, the side edges of the head extending upwardly and inwardly at a small angle to the axis of the shaft, and at least one top edge of the head extending at right angles to the axis of the shaft, said head being provided centrally with a substantially V-shaped slot having its lower narrow end disposed at about one-third of the height of the head and rounded, said slot subdividing the head into two legs on opposite sides of the axis of the shaft.

2. A tooth root pivot as claimed in claim 1, in which the upper end of each leg is provided with an inwardly projecting portion spaced from the corresponding inwardly projecting portion of the other leg to leave a passage into the top of the V-shaped slot.

3. A tooth root pivot as claimed in claim 1, in which the two legs of the head have the same height.

4. A tooth root pivot as claimed in claim 1, in which the two legs of the head have the same height and are provided with inwardly projecting top portions having their inner edges spaced to leave a passage into the top of the V-shaped slot.

5. A tooth root pivot as claimed in claim 1, in which the two legs are of different heights and have at their upper ends inwardly projecting portions both extending approximately to the axis of the shaft and disposed at a distance one above the other to leave a passage into the top of the V-shaped slot.

6. A tooth root pivot as claimed in claim 1, in which depressions are provided in the inner faces of the two legs of the head.

7. The combination with a tooth crown having a cavity of substantially frusto-pyramidical outline of a tooth root pivot, comprising a substantially cylindrical shaft provided with a screw thread, a plate-shaped head integral with the upper end of said shaft, the lower edges of said head extending upwardly and outwardly from the top of the shaft at an angle of about 120° relative to the axis of the shaft, the side edges of the head extending upwardly and inwardly at a small angle to the axis of the shaft, and at least one top edge of the head extending at right angles to the axis of the shaft, said head being provided centrally with a substantially V-shaped slot having its lower narrow end disposed at about one-third of the height of the head and rounded, said slot subdividing the head into two legs on opposite sides of the axis of the shaft.

8. A combination as claimed in claim 7, in which the tooth crown has a lining and a transversal cross-pin attached to opposite sides of the lining, said cross-pin being disposed in the rounded lower end of the V-shaped slot when the crown is mounted on the pivot.

9. A combination as claimed in claim 7, in which the crown has a lining and is provided with depressions in its inner wall near the edges of the crown.

JOSEPH RUETZ.